(12) United States Patent
Bhupathi et al.

(10) Patent No.: US 11,545,910 B2
(45) Date of Patent: Jan. 3, 2023

(54) HYBRID CAPACITOR BANK FOR A POWER CONVERSION ASSEMBLY

(71) Applicant: General Electric Renovables Espana, S.L., Barcelona (ES)

(72) Inventors: Rajesh Bhupathi, Roanoke, VA (US); Robert Gregory Wagoner, Roanoke, VA (US); Zane Taylor Miller, Christiansburg, VA (US); Fernando Arturo Ramirez Sanchez, Salem, VA (US); Bacil Shaqqo, Roanoke, VA (US); Joseph Kiran Banda, Bangalore (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/005,599

(22) Filed: Aug. 28, 2020

(65) Prior Publication Data

US 2022/0069726 A1 Mar. 3, 2022

(51) Int. Cl.
*H02M 5/458* (2006.01)
*H02J 3/38* (2006.01)
(Continued)

(52) U.S. Cl.
CPC ........... *H02M 5/4585* (2013.01); *H02J 3/381* (2013.01); *H02M 7/003* (2013.01); *H02J 2300/28* (2020.01); *H02M 1/14* (2013.01)

(58) Field of Classification Search
CPC .. H02M 1/14; H02M 1/44; H02M 5/42–4585; H02M 7/003; H02J 3/38–388; H05K 7/04
See application file for complete search history.

(56) References Cited

U.S. PATENT DOCUMENTS 5,825,639 A 10/1998 Wagoner
10,075,064 B2 * 9/2018 Perreault ............ H02M 1/4208
(Continued)

FOREIGN PATENT DOCUMENTS

CN 102780388 A 11/2012
CN 206559223 U * 10/2017
(Continued)

OTHER PUBLICATIONS

Translation of JP 2015-133883 A (Shimada et al.). Original document published Jul. 23, 2015. Translation completed Feb. 2022 by Schreiber Translations, Inc. (Year: 2015).*
(Continued)

*Primary Examiner* — Fred E Finch, III
(74) *Attorney, Agent, or Firm* — Dority & Manning, P.A.

(57) ABSTRACT

A power conversion assembly includes a power converter having a plurality of switching devices, a power source electrically coupled to the power converter, and a direct current (DC) filter circuit bridging the power converter and the power source. The DC filter circuit includes a DC link having a positive rail, a negative rail, and a capacitor bank. The capacitor bank includes a first set of capacitors being a first type of capacitors and a second set of capacitors being a different, second type of capacitors. Each capacitor in the first set of capacitors is positioned closer to a respective switching device of the plurality of switching devices than a corresponding capacitor of the second set of capacitors to minimize impedance between each capacitor in the first set of capacitors and the respective switching device such that a majority of ripple current from the plurality of switching devices passes through the first set of capacitors.

17 Claims, 8 Drawing Sheets

(51) Int. Cl.
   *H02M 1/14*      (2006.01)
   *H02M 7/00*      (2006.01)

(56) References Cited

U.S. PATENT DOCUMENTS

| | | | |
|---|---|---|---|
| 10,218,262 B1 * | 2/2019 | Agirman | H02M 5/00 |
| 10,246,294 B2 | 4/2019 | Agirman et al. | |
| 2011/0074361 A1 * | 3/2011 | Tao | H02M 7/06 |
| | | | 320/137 |
| 2012/0056484 A1 * | 3/2012 | Mumtaz | H02H 7/16 |
| | | | 307/86 |
| 2013/0176753 A1 * | 7/2013 | Swamy | H02M 1/4216 |
| | | | 363/37 |
| 2014/0036418 A1 * | 2/2014 | Eichler | F03D 9/25 |
| | | | 361/605 |
| 2014/0313781 A1 * | 10/2014 | Perreault | H02J 5/00 |
| | | | 363/13 |
| 2016/0327998 A1 * | 11/2016 | Webster | G06F 1/28 |
| 2020/0266629 A1 * | 8/2020 | Spooner | G01R 31/346 |
| 2020/0287378 A1 * | 9/2020 | Spooner | H02H 7/261 |

FOREIGN PATENT DOCUMENTS

| | | | | |
|---|---|---|---|---|
| DE | 102009053061 A1 * | 5/2011 | | H02M 5/45 |
| EP | 3393034 A1 | 10/2018 | | |
| JP | 2015133883 A * | 7/2015 | | H02M 5/45 |

OTHER PUBLICATIONS

European Search Report for EP Application No. 21192798,3, dated Jan. 21, 2022.

\* cited by examiner

HYBRID CAPACITOR BANK FOR A POWER CONVERSION ASSEMBLY

FIELD

The present disclosure relates in general to power conversion assemblies, and more particularly to a hybrid capacitor bank for a power conversion assembly.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a power conversion assembly and/or a transformer housed within the tower and subsequently deployed to a utility grid. Modern wind power generation systems typically take the form of a wind farm having multiple such wind turbine generators that are operable to supply power to a transmission system providing power to an electrical grid.

The power conversion assembly may include, for example, AC/AC voltage conversion, that is accomplished using a rotor side converter and a line side converter. The rotor side converter and the line side converter may be coupled via a DC link across which may include a DC link capacitor or capacitor bank. Thus, AC/AC conversion generally includes converting one AC supply to DC, then back to AC of a different voltage or frequency. The DC link between the two must remain stable for the second converter to successfully perform its function. Therefore, the capacitance of the DC link capacitance is used to provide a stabilizing force to maintain the DC link voltage within margins that the machine can function. The quantity of the capacitance scales with the power rating of the device, as more incoming current can shift the DC link more quickly, so more capacitance is required to maintain the DC link in a stable condition. Conventionally, a single type of capacitor has been used in DC link capacitor banks.

Thus, the art is continuously seeking new and improved systems and methods that decrease the cost and volume of the power conversion assembly, while also providing enough capacitance for the DC link to remain stable. As such, the present disclosure is directed to systems and methods that incorporate different types of capacitors in a configuration that highlights the primary benefits of each type, while also mitigating their respective weaknesses.

BRIEF DESCRIPTION

Aspects and advantages of the invention will be set forth in part in the following description, or may be obvious from the description, or may be learned through practice of the invention.

In one aspect, the present disclosure is directed to a power conversion assembly. The power conversion assembly includes a power converter having a plurality of switching devices, a power source electrically coupled to the power converter, and a direct current (DC) filter circuit bridging the power converter and the power source. The DC filter circuit includes a DC link having a positive rail, a negative rail, and a capacitor bank bridging the power converter and the power source. The capacitor bank is configured for maintaining a voltage of the DC link within a certain range. Further, the capacitor bank includes a plurality of capacitors coupled to the positive rail and the negative rail. The plurality of capacitors includes, at least, a first set of capacitors being a first type of capacitors and a second set of capacitors being a different, second type of capacitors. Moreover, each capacitor in the first set of capacitors is positioned closer to a respective switching device of the plurality of switching devices than a corresponding capacitor of the second set of capacitors to minimize impedance between each capacitor in the first set of capacitors and the respective switching device such that a majority of ripple current from the plurality of switching devices passes through the first set of capacitors.

In an embodiment, the power converter may be an AC-DC converter or a DC-AC converter. In another embodiment, the power converter may be a multi-level power converter. Further, in an embodiment, the plurality of switching devices may include one or more Insulated Gated Bipolar Transistors and/or one or more Silicon Carbide Metal Oxide Semiconductor Field Effect Transistors (Sic MOSFET).

In further embodiments, the first type of capacitors may be film capacitors, whereas the second type of capacitors may include electrolytic capacitors. Thus, in certain embodiments, the electrolytic capacitors have a higher capacitance than the film capacitors or vice versa.

In additional embodiments, the electrolytic capacitors are connected in parallel with the film capacitors. In particular embodiments, the electrolytic capacitors may be integral within the DC filter circuit. Alternatively, the electrolytic capacitors may be external to the DC filter circuit. For example, in an embodiment, the electrolytic capacitors may be placed in a separate box apart from the film capacitors or the electrolytic capacitors are more electrically removed from the DC filter circuit via physical positioning relative to the film capacitors.

In certain embodiments, the power source may be an converter, an inverter, or a DC energy source. For example, in an embodiment, the DC energy source may include a battery, a solar panel, or a fuel cell. In several embodiments, where the power source is the converter or the inverter, the power source may also be coupled to a generator and/or a motor.

In yet another embodiment, the power conversion assembly may be part of a wind turbine power system, a solar power system, a hydropower system, a tidal power system, a fuel cell power system, an energy storage power system, or a hybrid power system. For example, in an embodiment, the power conversion assembly may be part of the wind turbine power system. Thus, in such embodiments, the power converter may be a line side converter of the wind turbine power system and the power source may be a rotor side converter of the wind turbine power system.

In another aspect, the present disclosure is directed to a wind turbine power system. The wind turbine power system includes a rotor having a rotatable hub with at least one rotor blade mounted thereto, a generator coupled to the rotor, and a power conversion assembly. The power conversion assembly includes a line side converter, a rotor side converter, and a direct current (DC) filter circuit bridging the line side converter and the rotor side converter. The line side converter includes a plurality of switching devices. The DC filter circuit includes a DC link having a positive rail, a negative rail, and a capacitor bank bridging the line side converter and a rotor side converter. The capacitor bank is configured for maintaining a voltage of the DC link within a certain range. The capacitor bank includes a plurality of capacitors coupled to the positive rail and the negative rail. The plurality of capacitors includes, at least, a first set of capacitors being a first type of capacitors connected in parallel with a second set of capacitors being a different, second type of capacitors. Further, each capacitor in the first set of capacitors is positioned closer to a respective switching device of the plurality of switching devices than a corresponding capacitor of the second set of capacitors to minimize impedance between each capacitor in the first set of capacitors and the respective switching device such that a majority of ripple current from the plurality of switching devices passes through the first set of capacitors. The wind turbine power system may also include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
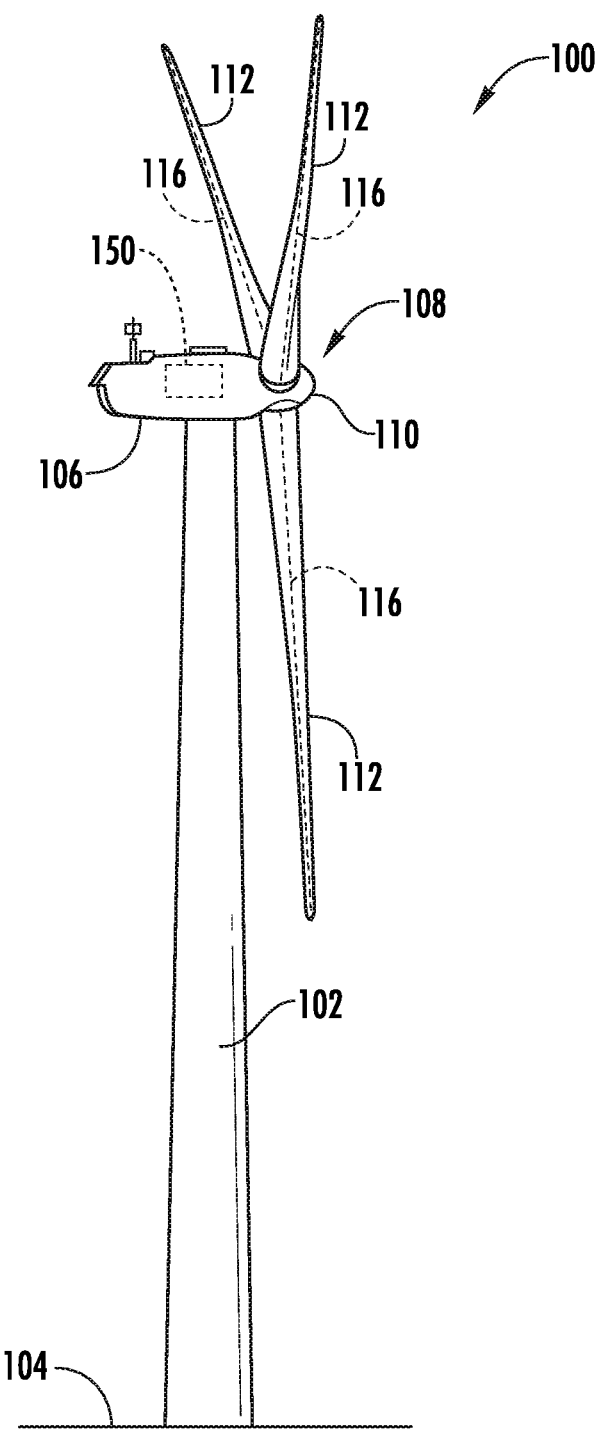
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to a power conversion assembly that utilizes multiple types of capacitors arranged in a physical configuration that highlights each of their benefits. More specifically, a first type of capacitors, such as film capacitors, may be placed as close to the switching devices of a power converter of the power conversion assembly as possible so that there is very low impedance between these capacitors and the devices. This positioning will ensure that most of the high frequency ripple current caused by the semiconductor switching events will pass through these capacitors. As an aside, these low impedance capacitors also have a benefit of reducing stress on the semiconductors, while also contributing at least some capacitance. Some distance away (e.g. either in a separate container or box or combined with the first type of capacitors), the power conversion assembly includes a different, second type of capacitors, such as electrolytic capacitors. Thus, the impedance between the bank of electrolytic capacitors and the switching devices reduces the high frequency ripple that these capacitors experience, so the electrolytic capacitors are not stressed, which would reduce their lifetime. The electrolytic capacitors are also configured to provide the bulk capacitance to ensure control stability and contribute some ripple currents capability.

Accordingly, the present disclosure has many advantages not present in the prior art. For example, the hybrid capacitor bank reduces the total volume of capacitors required. This is especially advantageous is a three- or higher-level power converter because the difference between the minimum capacitors for control stability is much lower than the minimum electrolytic capacitors to carry ripple current. Moreover, the capacitor bank of the present disclosure provides cost savings by incorporating film capacitors because the cost of a hybrid capacitor bank is lower than the cost of a purely electrolytic bank with required capacitance value and ripple current capability. For example, in an embodiment, the film capacitors perform the function of a low impedance snubber capacitor on the switching devices to reduce voltage stress and thus improve lifetime expectations of the semiconductor devices without having to purchase another dedicated capacitor.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 150 positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
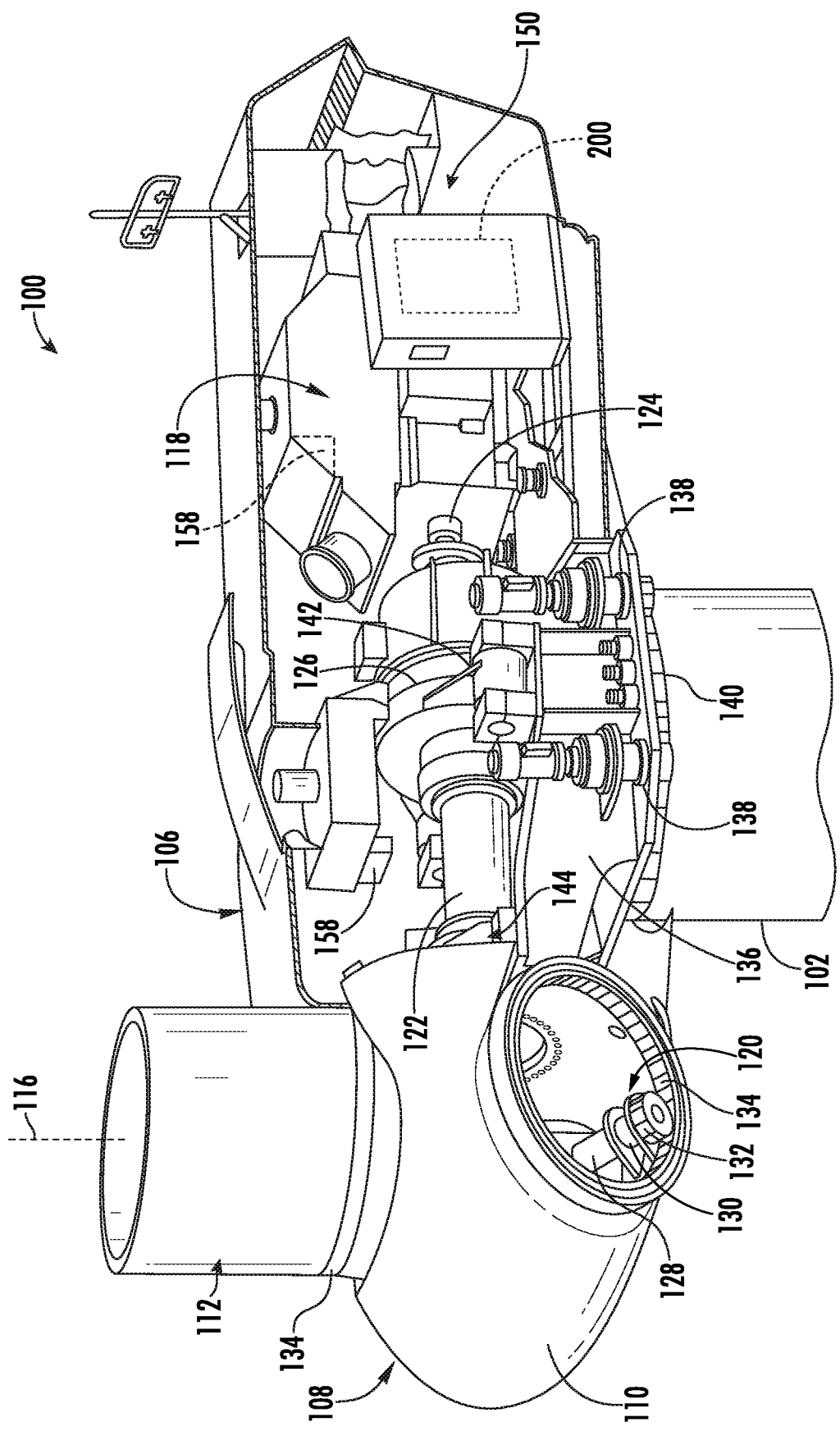
FIG. 2 illustrates a perspective, internal view of one embodiment of a nacelle of the wind turbine according to the present disclosure.

Referring now to FIG. 2, a simplified, internal view of one embodiment of the nacelle 106 according to the present disclosure is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears 148 to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

Each rotor blade 112 may also include a pitch control mechanism 120 configured to rotate the rotor blade 112 about its pitch axis 116. Each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Figure 3:
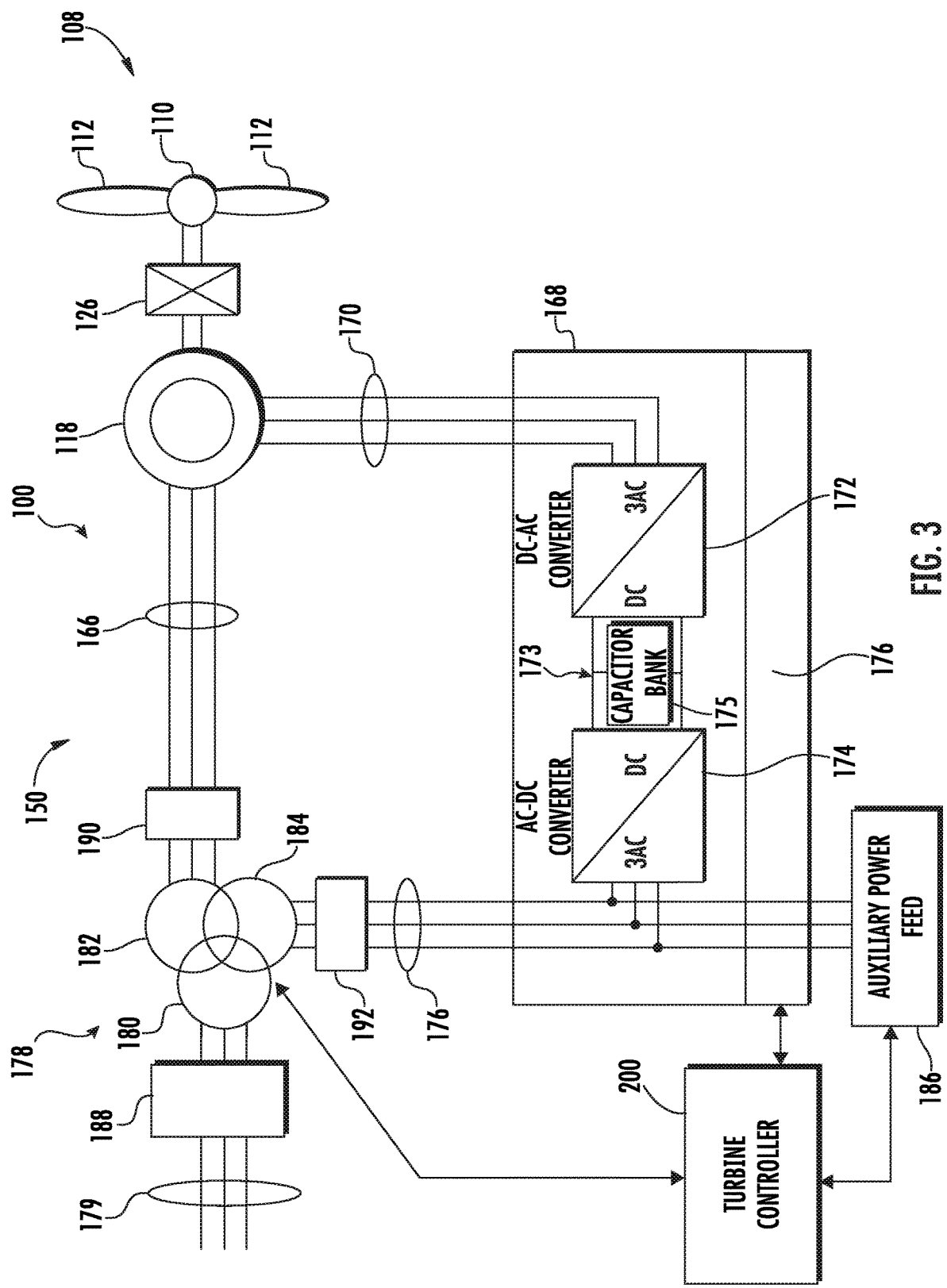
FIG. 3 illustrates a schematic diagram of one embodiment of an electrical system for use with the wind turbine according to the present disclosure.

Referring now to FIG. 3, a schematic diagram of one embodiment of an electrical system 150 according to the present disclosure is illustrated. For example, as shown, the generator 118 may be a doubly-fed induction generator (DFIG). The generator 118 may be coupled to a stator bus 166 and a power conversion assembly 168 via a rotor bus 170. In such a configuration, the stator bus 166 may provide an output multiphase power (e.g. three-phase power) from a stator of the generator 118, and the rotor bus 170 may provide an output multiphase power (e.g. three-phase power) of the rotor of the generator 118. More specifically, the power conversion assembly 168 may include a rotor side converter 172 and a line side converter 174. Thus, as shown, the generator 118 may be coupled to the rotor side converter 172 via the rotor bus 170. Furthermore, as shown, the rotor side converter 172 may be coupled to the line side converter 174 via a DC link 173 across which may be a capacitance bank 175, which is described in more detail with respect to FIGS. 5-9. The line side converter, may, in turn, be coupled to a line side bus 176.

In an embodiment, the rotor side converter 172 and the line side converter 174 may be configured for normal operating mode in a three-phase, pulse width modulation (PWM) arrangement using insulated gate bipolar transistors (IGBTs) as switching devices. Other suitable switching devices may be used, such as insulated gate commuted thyristors, MOSFETs, bipolar transistors, silicone controlled rectifier's, and/or other suitable switching devices.

In an embodiment, the power conversion assembly 168 may be controlled via a converter controller 202. For example, the converter controller 202 may send control commands to the rotor side converter 172 and the line side converter 174 to control the modulation of switching elements used in the power conversion assembly 168 to establish a desired generator torque setpoint and/or power output. The converter controller 202 may also be communicatively coupled to the turbine controller 200.

As further depicted in FIG. 3, the electrical system 150 may, in an embodiment, include a transformer 178 coupling the wind turbine 100 to an electrical grid 179. The transformer 178 may, in an embodiment, be a three-winding transformer which includes a high voltage (e.g. greater than 12 KVAC) primary winding 180. The high voltage primary winding 180 may be coupled to the electrical grid 179. The transformer 178 may also include a medium voltage (e.g. 6

KVAC) secondary winding 182 coupled to the stator bus 166 and a low voltage (e.g. 575 VAC, 690 VAC, etc.) auxiliary winding 184 coupled to the line bus 176. It should be appreciated that the transformer 178 can be a three-winding transformer as depicted, or alternatively, may be a two-winding transformer having only a primary winding 180 and a secondary winding 182; may be a four-winding transformer having a primary winding 180, a secondary winding 182, and auxiliary winding 184, and an additional auxiliary winding; or may have any other suitable number of windings.

In an additional embodiment, the electrical system 150 may include an auxiliary power feed 186 coupled to the output of the power conversion assembly 168. The auxiliary power feed 186 may act as a power source for various components of the wind turbine system 100. For example, the auxiliary power feed 186 may power fans, pumps, motors, and other suitable components of the wind turbine system 100.

In an embodiment, the electrical system 150 may also include various circuit breakers, fuses, contactors, and other devices to control and/or protect the various components of the electrical system 150. For example, the electrical system 150 may, in an embodiment, include a grid circuit breaker 188, a stator bus circuit breaker 190, and/or a line bus circuit breaker 192. The circuit breaker(s) 188, 190, 192 of the electrical system 150 may connect or disconnect corresponding components of the electrical system 150 when a condition of the electrical system 150 approaches an operational threshold of the electrical system 150.

Figure 4:
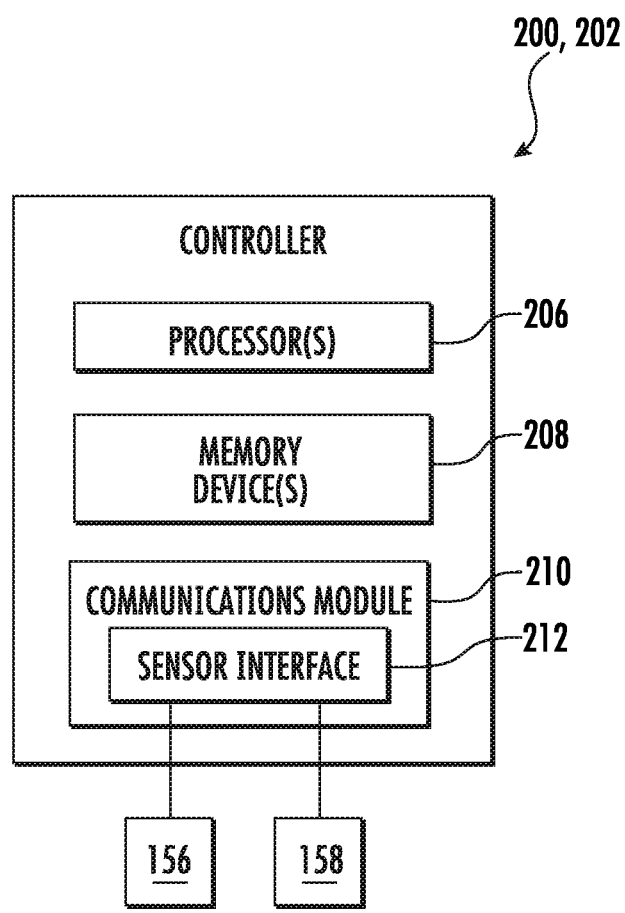
FIG. 4 illustrates a schematic diagram of one embodiment of a controller for use with the wind turbine according to the present disclosure.

Referring now to FIG. 4, a block diagram of one embodiment of suitable components that may be included within the controller (e.g. the turbine controller 200 or the converter controller 202) according to the present disclosure is illustrated. For example, as shown, the controller 200, 202 may include one or more processor(s) 206 and associated memory device(s) 208 configured to perform a variety of computer-implemented functions (e.g., performing the methods, steps, calculations and the like and storing relevant data as disclosed herein). Additionally, the controller 200, 202, may also include a communications module 210 to facilitate communications between the controller 200, 202, and the various components of the wind turbine 100. Further, the communications module 210 may include a sensor interface 212 (e.g., one or more analog-to-digital converters) to permit signals transmitted from various sensor(s) 156, 158 to be converted into signals that can be understood and processed by the processors 206. It should be appreciated that the sensor(s) 156, 158 may be communicatively coupled to the communications module 210 using any suitable means. For example, as shown in FIG. 4, the sensors 156, 158 are coupled to the sensor interface 212 via a wired connection. However, in other embodiments, the sensors 156, 158 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200, 202 to perform various functions including, but not limited to, detecting an anonymous operational event and initiating an enhanced braking mode for the wind turbine 100 as described herein, as well as various other suitable computer-implemented functions.

Figure 5:
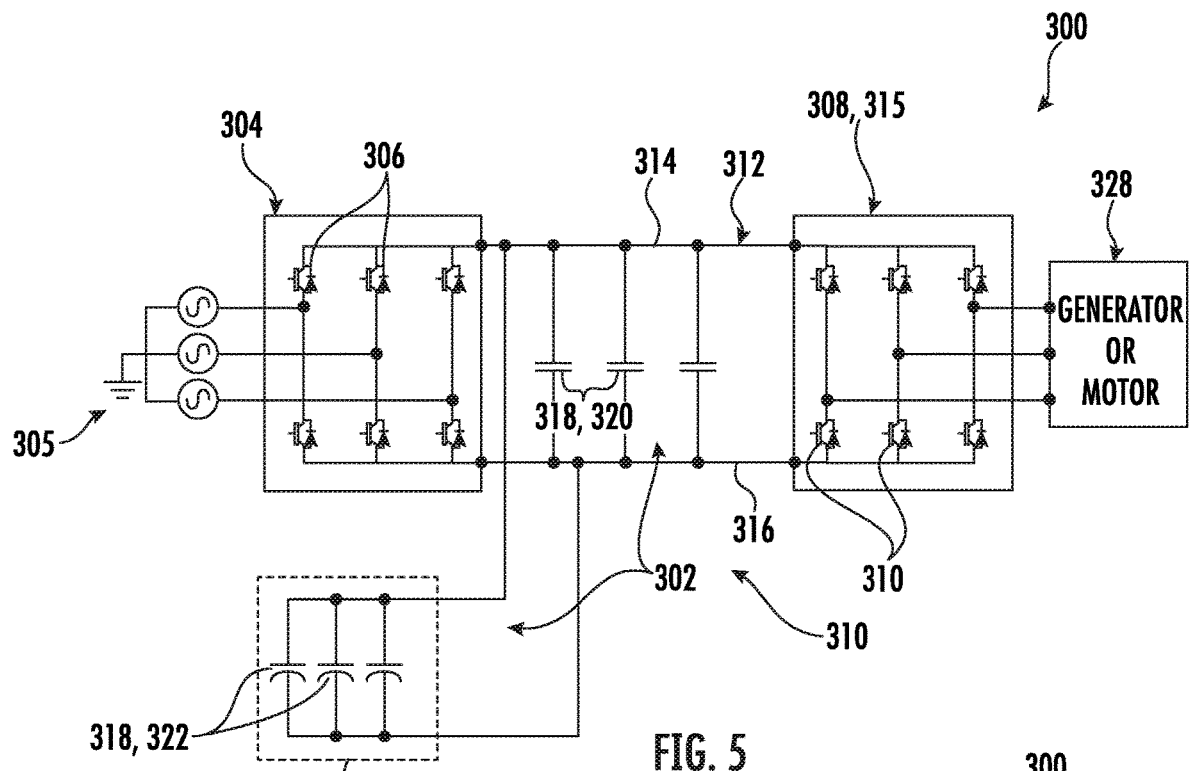
FIG. 5 illustrates a schematic diagram of one embodiment of a power conversion assembly according to the present disclosure.

Referring now to FIGS. 5-9, schematic diagrams of various embodiments of a power conversion assembly 300 having a capacitor bank 302 according to the present disclosure are illustrated. As an example, and as referenced with respect to FIGS. 1-3, the power conversion assembly 300 may be part of a wind turbine power system 100. Further, FIG. 5 illustrates a power conversion assembly 300 similar to the power conversion assembly 168 of the wind turbine power system of FIG. 3. However, as further illustrated in FIGS. 6-8, it should be understood that the capacitor bank 302 of the present disclosure may be used with any three-phase variable or fixed AC supply or power grid, represented as element 305 in FIGS. 5-9. Accordingly, the power conversion assembly 300 described herein may be utilized with a solar power system, a hydropower system, a tidal power system, a fuel cell power system, an energy storage power system, or a hybrid power system.

Thus, as shown in FIGS. 5-9, the capacitor bank 302 can be utilized with any power converter/inverter 304 electrically coupled with any suitable power source 308. For example, in certain embodiments, the power converter 304 may be an AC-DC converter or a DC-AC converter, as well as any two-level or any higher multi-level power converter with neutral-point-clamped (NPC), active neutral-point-clamped (ANPC), T-type NPC or Cascaded H-bridges or flying capacitor configurations).

Figure 6:
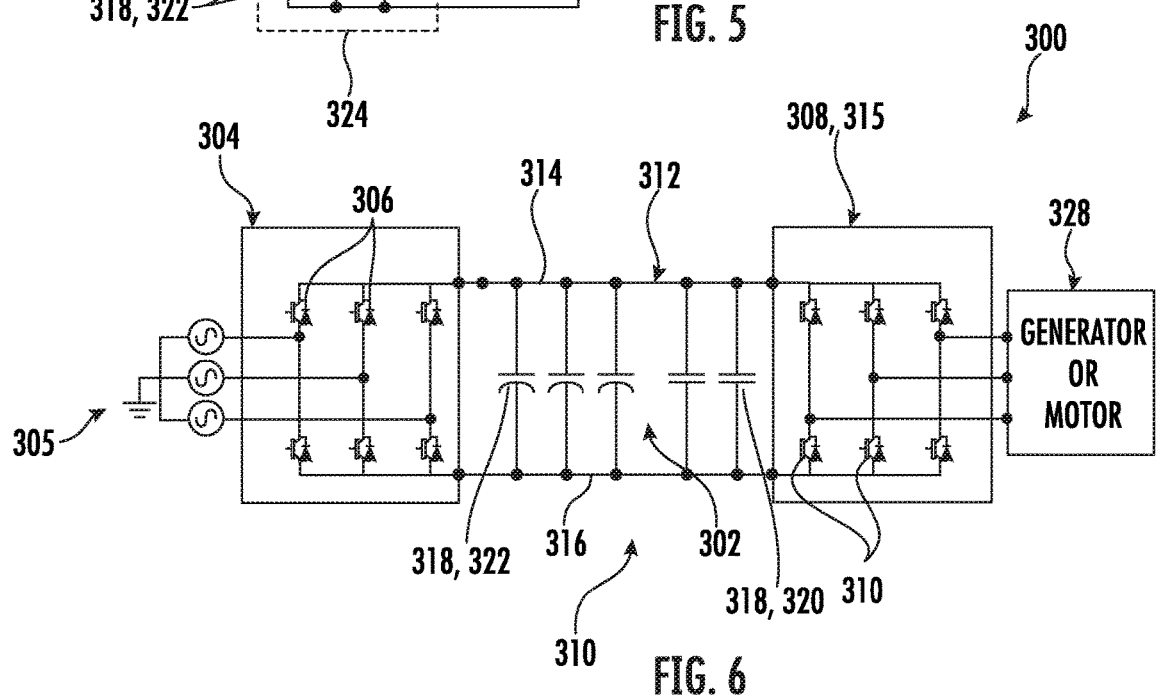
FIG. 6 illustrates a schematic diagram of another embodiment of a power conversion assembly according to the present disclosure.

Moreover, in certain embodiments, the power source 308 may be an converter, an inverter, or a DC energy source. For example, as shown in FIGS. 5 and 6, the power source 308 corresponds to a converter/inverter 315. More specifically, in particular embodiments, in which the power conversion assembly 300 is part of the wind turbine power system 100, the power converter 304 may be the line side converter 174, whereas the power source 308 may be the rotor side converter 172.

Figure 7:
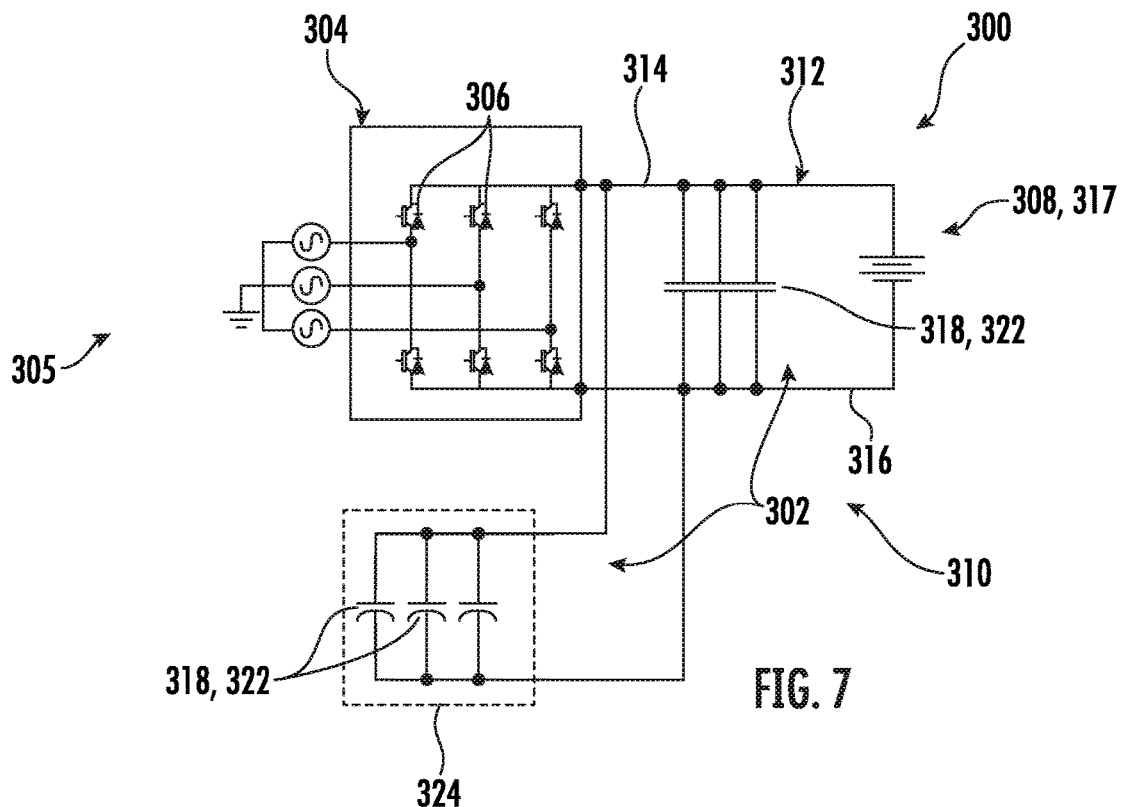
FIG. 7 illustrates a schematic diagram of yet another embodiment of a power conversion assembly according to the present disclosure.
Figure 8:
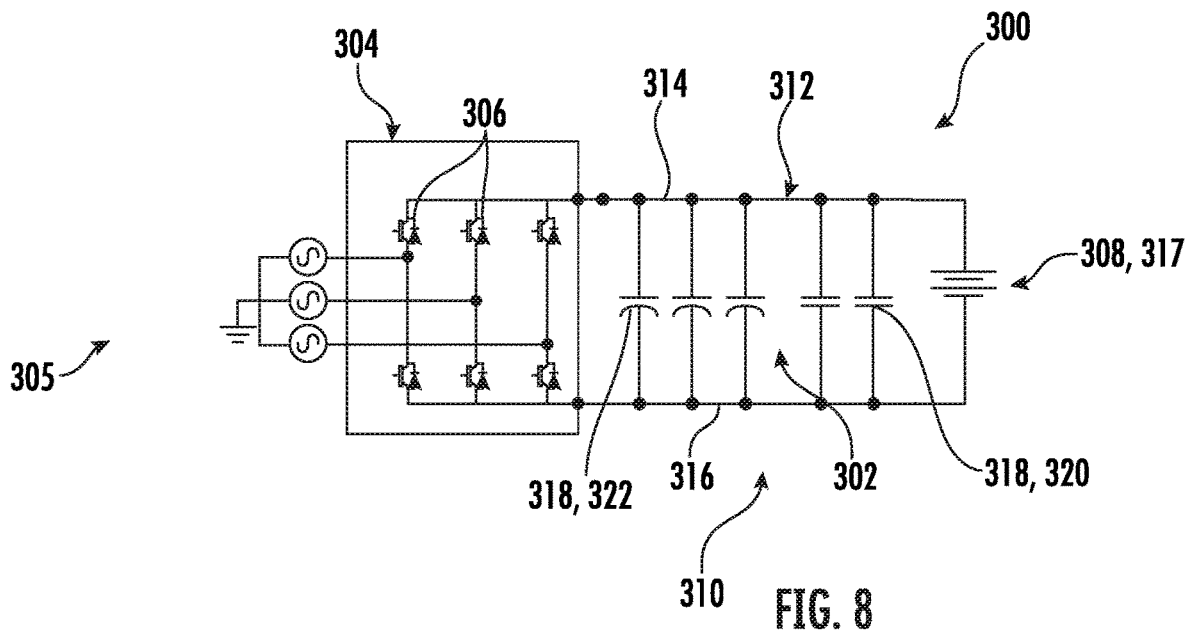
FIG. 8 illustrates a schematic diagram of still another embodiment of a power conversion assembly according to the present disclosure.

Alternatively, as shown in FIGS. 7 and 8, the power source 308 may correspond to a DC energy source 317. In such embodiments, the DC energy source 317, as an example, may include a battery/battery-powered source, a solar panel, a fuel cell, a wind power source, or combinations thereof. Moreover, as shown in FIGS. 5 and 6, in several embodiments, where the power source 308 is the converter or the inverter, the power source 308 may also be coupled to a generator and/or a motor, as shown at 328. Thus, the generator/motor 328 may be a wind source, a tidal/hydro source, a fuel cell, and/or any other power conversion application/load, such as marine, healthcare, automation, and/or avionics applications.

Furthermore, as shown in FIGS. 5-9, the power converter 304 described herein may include any suitable switching devices 306, such as semiconductor switches. In particular, the switching elements 306 may include one or more Insulated Gated Bipolar Transistors and/or one or more Silicon Carbide Metal Oxide Semiconductor Field Effect Transistors (Sic MOSFET). In addition, as shown in FIG. 5, the power conversion assembly 300 may also include a direct current (DC) filter circuit 210 bridging the power converter 306 and the power source 308.

Further, as shown, the DC filter circuit 310 includes a DC link 312 having a positive rail 314 and a negative rail 316, such that the capacitor bank 302 bridges the power converter 306 and the power source 308. Thus, the capacitor bank 302 is configured for maintaining a voltage of the DC link 312 within a certain range. Further, the capacitor bank 302 includes a plurality of capacitors 318 coupled to the positive rail 314 and the negative rail 316. More specifically, as shown, the plurality of capacitors 318 includes, at least, a first set 320 of capacitors being a first type of capacitors and a second set 322 of capacitors being a different, second type of capacitors. For example, in an embodiment, the first type of capacitors 320 may be film capacitors, whereas the second type of capacitors 322 may include electrolytic capacitors. Thus, in certain embodiments, the electrolytic capacitors 322 may have a higher capacitance than the film capacitors 320. In additional embodiments, as shown generally in FIGS. 5-9, the electrolytic capacitors 322 may be connected in parallel with the film capacitors 320.

In particular embodiments, as shown in FIGS. 6 and 8, the electrolytic capacitors 322 may be integral within the DC filter circuit 310. Alternatively, as shown in FIGS. 5 and 7, the electrolytic capacitors 322 may be external to the DC filter circuit 310. For example, as shown, in particular embodiments, the electrolytic capacitors 322 may be placed in a separate box 324 apart from the film capacitors 320. In yet another embodiment, the electrolytic capacitors 322 may be more electrically removed from the DC filter circuit 310, e.g. via any suitable physical positioning relative to the film capacitors 320.

Figure 9:
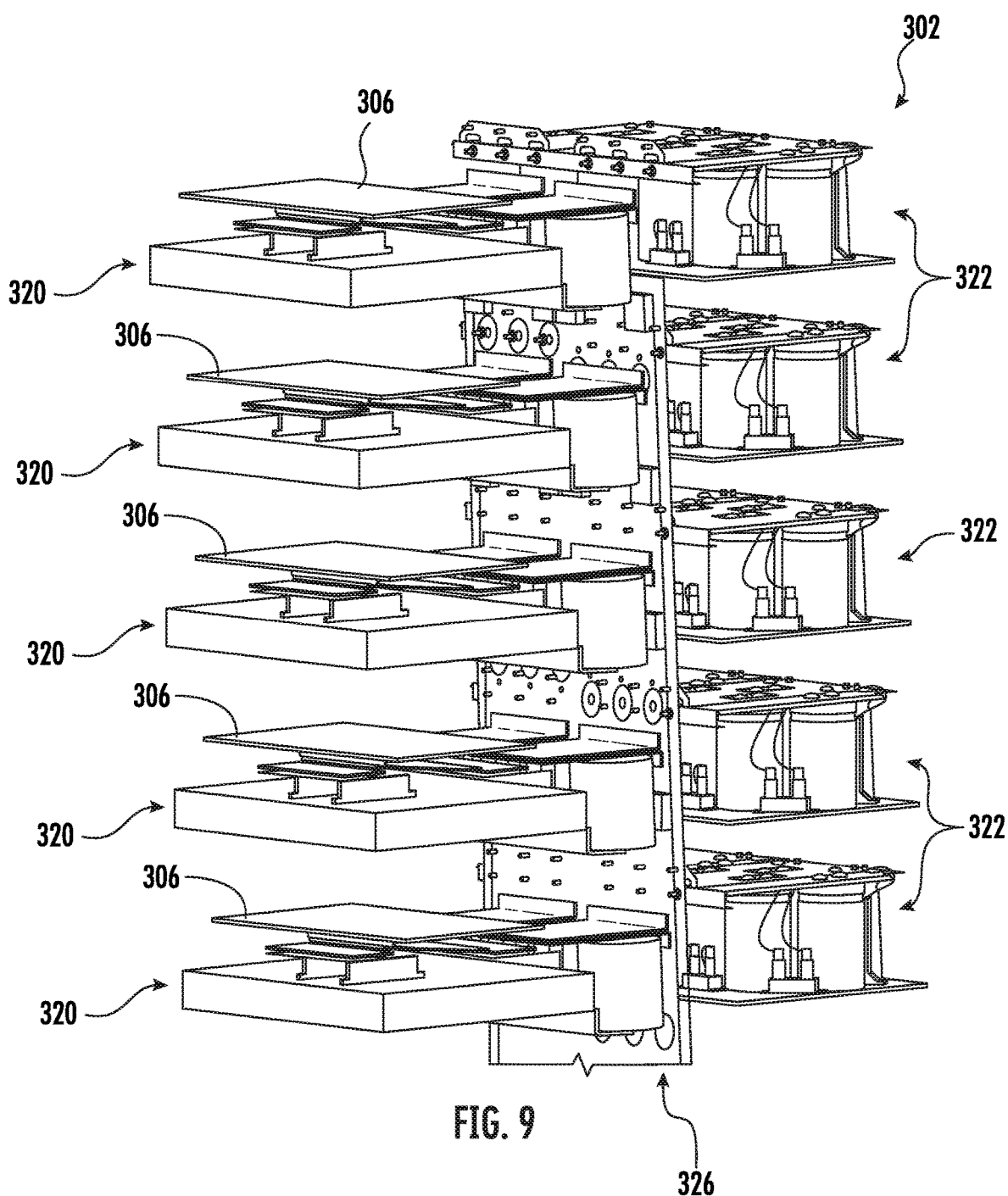
FIG. 9 illustrates a perspective of one embodiment of a capacitor bank of a power conversion assembly according to the present disclosure.

Moreover, as shown particularly in FIG. 9, each capacitor 320 in the first set 320 of capacitors is positioned closer to a respective switching device 306 of the plurality of switching devices than a corresponding capacitor 322 of the second set 322 of capacitors to minimize impedance between each capacitor 320 in the first set of capacitors and the respective switching device 306. This positioning/arrangement ensures that the majority of the high frequency ripple current caused by the semiconductor switching events 306 passes through the film capacitors 320. In addition, in certain embodiments, these low impedance capacitors 320 also reduce stress on the switching device 306, while contributing some overall capacitance.

Still referring to FIG. 9, some distance away, e.g. further down the busbar 326, the electrolytic capacitors 322 are coupled thereto. Accordingly, the impedance provided by the film capacitors 320 (and also between the electrolytic capacitors 322 and the switching devices 306 is configured to reduce the high frequency ripple current that the electrolytic capacitors 322 experience, such that the electrolytic capacitors 322 are not unduly stressed, thereby increasing their lifetime. Moreover, the electrolytic capacitors 322 are configured to provide the bulk capacitance to ensure control stability and contribute some ripple currents capability.

Figure 10:
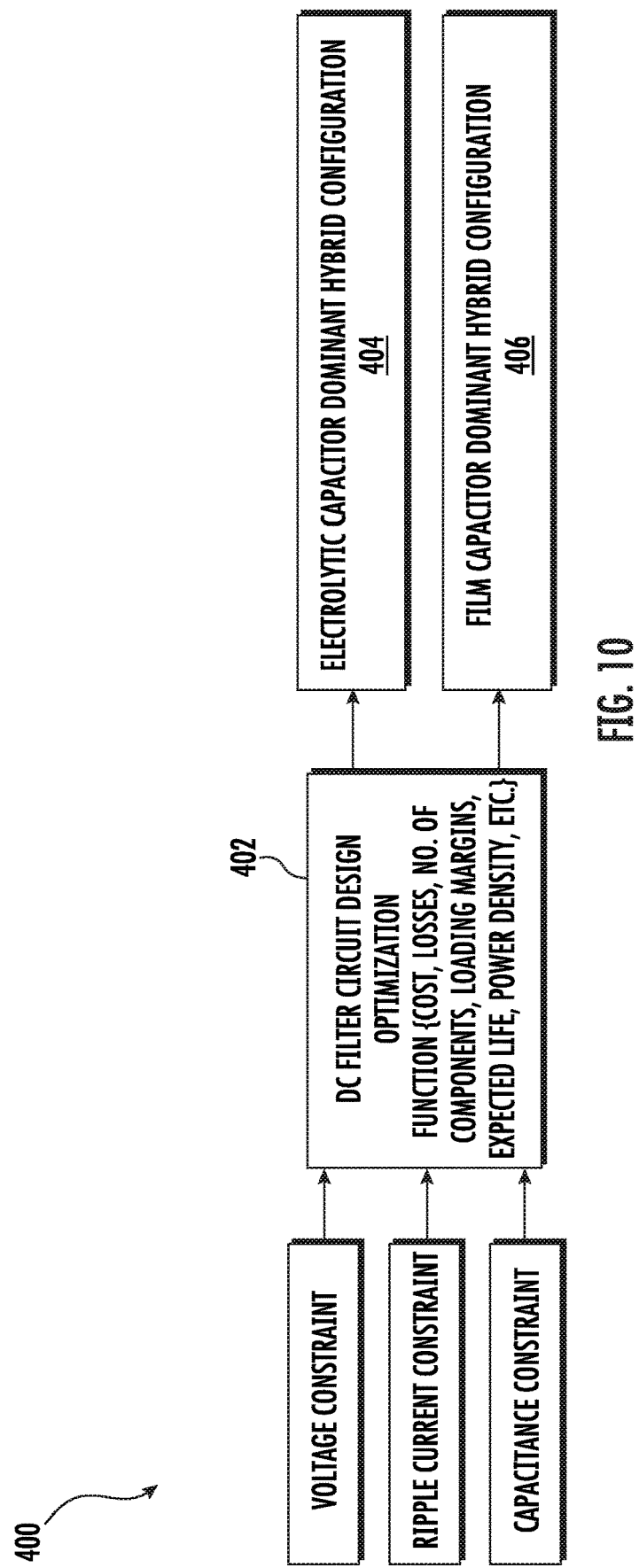
FIG. 10 illustrates a flow diagram of one embodiment of a system for operating a power conversion assembly according to the present disclosure is illustrated.

Referring now to FIG. 10, a flow diagram of an embodiment of a system 400 for operating a power conversion assembly according to the present disclosure is illustrated. For example, as shown, the system 400 may include a DC link circuit design optimization function 402 that determines an electrolytic capacitor dominant hybrid configuration 404 and/or a film capacitor dominant hybrid configuration 406. More specifically, as shown, the DC link filter circuit design optimization function 402 receives one or more parameters (such as cost, power loss, the number of components, the loading margins of the capacitors, expected life, and/or the power density) and determines the electrolytic and film capacitor dominant hybrid configurations 404, 406, respectively, by adhering to one or more design constraints (e.g. voltage, ripple current capability, and/or capacitance).

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Further aspects of the invention are provided by the subject matter of the following clauses:

Clause 1. A power conversion assembly, comprising:

a power converter comprising a plurality of switching devices;

a power source electrically coupled to the power converter; and a direct current (DC) filter circuit bridging the power converter and the power source, the DC filter circuit comprising a DC link comprising a positive rail, a negative rail, and a capacitor bank bridging the power converter and the power source, the capacitor bank configured for maintaining a voltage of the DC link within a certain range, the capacitor bank comprising a plurality of capacitors coupled to the positive rail and the negative rail, the plurality of capacitors comprising, at least, a first set of capacitors being a first type of capacitors and a second set of capacitors being a different, second type of capacitors, wherein each capacitor in the first set of capacitors is positioned closer to a respective switching device of the plurality of switching devices than a corresponding capacitor of the second set of capacitors to minimize impedance between each capacitor in the first set of capacitors and the respective switching device such that a majority of ripple current from the plurality of switching devices passes through the first set of capacitors.

Clause 2. The power conversion assembly of clause 1, wherein the power converter comprises at least one of an AC-DC converter or a DC-AC converter.

Clause 3. The power conversion assembly of any of the preceding clauses, wherein the power converter comprises a multi-level power converter.

Clause 4. The power conversion assembly of any of the preceding clauses, wherein the plurality of switching devices comprises at least one of an Insulated Gated Bipolar Transistor or a Silicon Carbide Metal Oxide Semiconductor Field Effect Transistor (Sic MOSFET).

Clause 5. The power conversion assembly of any of the preceding clauses, wherein the first type of capacitors comprise film capacitors and the second type of capacitors comprise electrolytic capacitors.

Clause 6. The power conversion assembly of clause 5, wherein the electrolytic capacitors have a higher capacitance than the film capacitors.

Clause 7. The power conversion assembly of clause 5, wherein the film capacitors have a higher capacitance than the electrolytic capacitors.

Clause 8. The power conversion assembly of clause 5, wherein the electrolytic capacitors are connected in parallel with the film capacitors.

Clause 9. The power conversion assembly of clause 5, wherein the electrolytic capacitors are integral within the DC filter circuit.

Clause 10. The power conversion assembly of clause 5, wherein the electrolytic capacitors are external to the DC filter circuit or the electrolytic capacitors are more electrically removed from the DC filter circuit via physical positioning relative to the film capacitors.

Clause 11. The power conversion assembly of clause 9, wherein the electrolytic capacitors are placed in a separate box apart from the film capacitors.

Clause 12. The power conversion assembly of any of the preceding clauses, wherein the power source comprises at least one of an converter, an inverter, or a DC energy source, the DC energy source comprising at least one of a battery, fuel cell, or a solar panel.

Clause 13. The power conversion assembly of clause 11, wherein the power source comprises the converter or the inverter coupled to at least one of a generator or a motor.

Clause 14. The power conversion assembly of any of the preceding clauses, wherein the power conversion assembly is part of a wind turbine power system, a solar power system, a hydropower system, a tidal power system, a fuel cell power system, an energy storage power system, or a hybrid power system.

Clause 15. The power conversion assembly of clause 14, wherein the power converter comprises a line side converter of the wind turbine power system and the power source comprises a rotor side converter of the wind turbine power system.

Clause 16. A wind turbine power system, comprising:
a rotor comprising a rotatable hub having at least one rotor blade mounted thereto;
a generator coupled to the rotor;
a power conversion assembly comprising a line side converter, a rotor side converter, and a direct current (DC) filter circuit bridging the line side converter and the rotor side converter, the line side converter comprising a plurality of switching devices, the DC filter circuit comprising a DC link comprising a positive rail, a negative rail, and a capacitor bank bridging the line side converter and a rotor side converter, the capacitor bank configured for maintaining a voltage of the DC link within a certain range, the capacitor bank comprising a plurality of capacitors coupled to the positive rail and the negative rail, the plurality of capacitors comprising, at least, a first set of capacitors being a first type of capacitors connected in parallel with a second set of capacitors being a different, second type of capacitors,
wherein each capacitor in the first set of capacitors is positioned closer to a respective switching device of the plurality of switching devices than a corresponding capacitor of the second set of capacitors to minimize impedance between each capacitor in the first set of capacitors and the respective switching device such that a majority of ripple current from the plurality of switching devices passes through the first set of capacitors.

Clause 17. The wind turbine power system of clause 16, wherein the line side converter or the rotor side converter comprise one of an AC-DC converter or a DC-AC converter.

Clause 18. The wind turbine power system of clauses 16-17, wherein the first type of capacitors comprise film capacitors and the second type of capacitors comprise electrolytic capacitors.

Clause 19. The wind turbine power system of clause 18, wherein the electrolytic capacitors are integral within the DC filter circuit.

Clause 20. The wind turbine power system of clause 18, wherein the electrolytic capacitors are external to the DC filter circuit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A power conversion assembly, comprising:
a power converter comprising a plurality of switching devices;
a power source electrically coupled to the power converter;
a direct current (DC) filter circuit bridging the power converter and the power source, the DC filter circuit comprising a DC link comprising a positive rail, a negative rail; and
a capacitor bank bridging the power converter and the power source, the capacitor bank configured for maintaining a voltage of the DC link within a certain range, the capacitor bank comprising a plurality of capacitors coupled to the positive rail and the negative rail, the plurality of capacitors comprising, at least, a first set of capacitors being a first type of capacitors and a second set of capacitors being a different, second type of capacitors,
wherein the first set of capacitors and the plurality of switching devices are mounted on a first side of a busbar and the second set of capacitors are mounted on a second, opposing side of the busbar such that each capacitor in the first set of capacitors is positioned closer to a respective switching device of the plurality of switching devices than a corresponding capacitor of the second set of capacitors to minimize impedance between each capacitor in the first set of capacitors and the respective switching device, thereby allowing a majority of ripple current from the plurality of switching devices to pass through the first set of capacitors, wherein the first type of capacitors comprise film capacitors and the second type of capacitors comprise electrolytic capacitors.

2. The power conversion assembly of claim 1, wherein the power converter comprises at least one of an AC-DC converter or a DC-AC converter.

3. The power conversion assembly of claim 1, wherein the plurality of switching devices comprises at least one of an Insulated Gated Bipolar Transistor or a Silicon Carbide Metal Oxide Semiconductor Field Effect Transistor (Sic MOSFET).

4. The power conversion assembly of claim 1, wherein the electrolytic capacitors have a higher capacitance than the film capacitors.

5. The power conversion assembly of claim 1, wherein the film capacitors have a higher capacitance than the electrolytic capacitors.

6. The power conversion assembly of claim 1, wherein the electrolytic capacitors are connected in parallel with the film capacitors.

7. The power conversion assembly of claim 1, wherein the electrolytic capacitors are integral within the DC filter circuit.

8. The power conversion assembly of claim 7, wherein the electrolytic capacitors are placed in a separate box apart from the film capacitors.

9. The power conversion assembly of claim 8, wherein the power source comprises the converter or an inverter coupled to at least one of a generator or a motor.

10. The power conversion assembly of claim 1, wherein the electrolytic capacitors are external to the DC filter circuit or the electrolytic capacitors are more electrically removed from the DC filter circuit via physical positioning relative to the film capacitors.

11. The power conversion assembly of claim 1, wherein the power source comprises at least one of a converter, an inverter, or a DC energy source, the DC energy source comprising at least one of a battery, fuel cell, or a solar panel.

12. The power conversion assembly of claim 1, wherein the power conversion assembly is part of a wind turbine power system, a solar power system, a hydropower system, a tidal power system, a fuel cell power system, an energy storage power system, or a hybrid power system.

13. The power conversion assembly of claim 12, wherein the power converter comprises a line side converter of the wind turbine power system and the power source comprises a rotor side converter of the wind turbine power system.

14. A wind turbine power system, comprising:
a rotor comprising a rotatable hub having at least one rotor blade mounted thereto;
a generator coupled to the rotor;
a power conversion assembly comprising a line side converter, a rotor side converter, and a direct current (DC) filter circuit bridging the line side converter and the rotor side converter, the line side converter comprising a plurality of switching devices, the DC filter circuit comprising a DC link comprising a positive rail, a negative rail; and
a capacitor bank bridging the line side converter and a rotor side converter, the capacitor bank configured for maintaining a voltage of the DC link within a certain range, the capacitor bank comprising a plurality of capacitors coupled to the positive rail and the negative rail, the plurality of capacitors comprising, at least, a first set of capacitors being a first type of capacitors connected in parallel with a second set of capacitors being a different, second type of capacitors, wherein the first set of capacitors and the plurality of switching devices are mounted on a first side of a busbar and the second set of capacitors are mounted on a second, opposing side of the busbar such that each capacitor in the first set of capacitors is positioned closer to a respective switching device of the plurality of switching devices than a corresponding capacitor of the second set of capacitors to minimize impedance between each capacitor in the first set of capacitors and the respective switching device, thereby allowing a majority of ripple current from the plurality of switching devices to pass through the first set of capacitors, wherein the first type of capacitors comprise film capacitors and the second type of capacitors comprise electrolytic capacitors.

15. The wind turbine power system of claim 14, wherein the line side converter or the rotor side converter comprise one of an AC-DC converter or a DC-AC converter.

16. The wind turbine power system of claim 14, wherein the electrolytic capacitors are integral within the DC filter circuit.

17. The wind turbine power system of claim 14, wherein the electrolytic capacitors are external to the DC filter circuit.

* * * * *